Oct. 23, 1962  K. R. CLINE  3,059,616
STALL STRUCTURE
Filed July 15, 1958
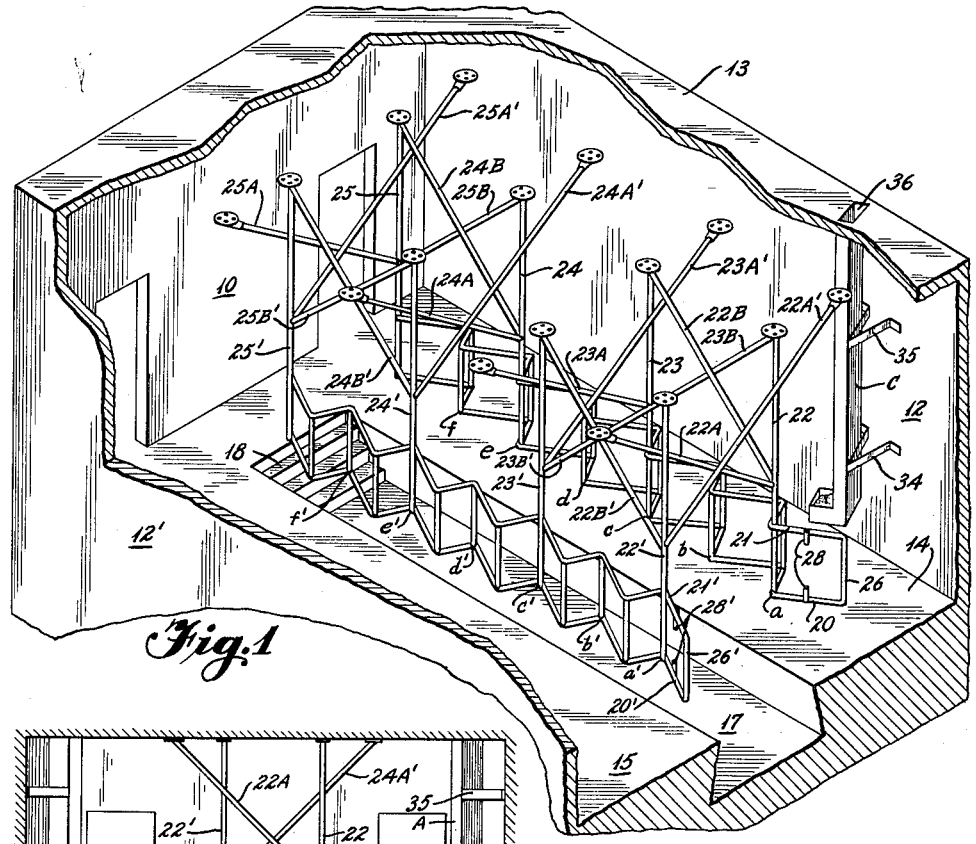
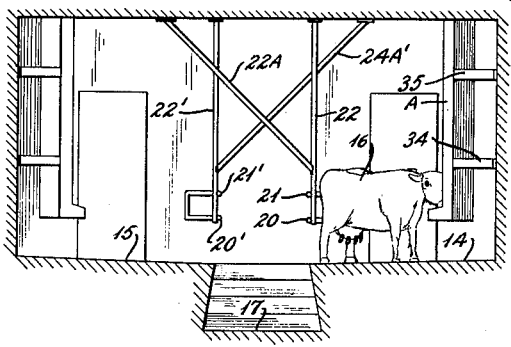
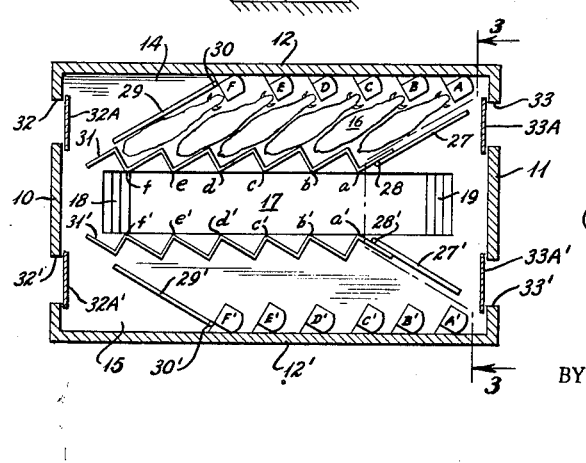
INVENTOR
K. R. CLINE
BY
ATTORNEY

United States Patent Office 3,059,616
Patented Oct. 23, 1962

3,059,616
STALL STRUCTURE
Kermit R. Cline, 1312 E. 44th St., Richmond, Va.
Filed July 15, 1958, Ser. No. 748,682
13 Claims. (Cl. 119—14.03)

The present invention relates to barns or milking parlor structures and particularly to the means for supporting the stalls, stall rails, and partitions so that such stalls are positively supported without contact with the floor. More particularly the invention relates to a milking room or parlor in which the two rows of cows are arranged in outwardly facing echelon formation in stalls with a milking operator's pit between the rows of cows.

Heretofore various barn structures and milking parlors have been provided to maintain cows in position for feeding and/or milking. In these previously known structures, the partition or rails around or between cows have been supported from the floor resulting in difficulty in cleaning the floors, difficulty in applying and removing milking machines to the cows, unsanitary condition around the point of contact of the stall supporting structure and the floor, and corrosion and deterioration of the supporting post at the floor.

An object of the present invention is to overcome the difficult problem of cleanliness in a milking parlor and to provide stall structures which are supported without contact with the floor.

Another object is to provide a suspension structure for stalls to effectively confine cattle in position for treatment, for milking or the like.

Another object is to provide sanitary and clean conditions for cows to increase the producitivity of the cows and to reduce the labor involved in the care and upkeep of the cows and the equipment used therewith.

Other and further objects of the invention will be apparent as the description proceeds and upon reference to the accompanying drawing wherein:

FIG. 1 is a fragmentary isometric view of a milking parlor showing the stall arrangement with the suspending supports and braces in position for attachment to the roof with the roof broken away to show the structure more clearly, a single feed chute being shown others being omitted for simplicity;

FIG. 2, a horizontal plan view of the herringbone arrangement of cows and stall forming rails and gates with the braces omitted; and FIG. 3, a transverse section on an enlarged scale through the milking parlor taken substantially on line 3—3 of FIG. 2.

Briefly stated the present invention comprises an elongated milking parlor with an elongated centrally located operator's pit and a stall on each side of the pit for receiving two rows of cows in a herringbone arrangement with their rumps adjacent the pit and with the cows in each row in echelon formation. A pair of zig-zag rails made up of L-shaped sections are arranged above the floor of the stalls and adjacent the edge of the pit and are supported from the ceiling or roof and free of supports from the floor, the rails being at a height to confine the cows while permitting ready access of the milkers to the udder of the cows. Adjacent the walls of the milking parlor, feed chutes are arranged in spaced relation to receive a cow between one feed chute and one leg of the corresponding L-shaped portion of the zig-zag rail, the cows being arranged so that one hip of one cow is positioned between adjacent the belly of the adjacent cow and the other hip is positioned adjacent the other leg of the L-shaped portion of the zig-zag rail thereby providing for close positioning of the cows. The group of cows are confined in the stalls by suitable gates provided at each end of the stall for entry of the cows to and exit of the cows from the stalls. The chutes and gates may be controlled from a feed control station adjacent the entry ends of the stalls so that an operator may induce the cows to rapidly assemble in the stalls with the leading cow taking the leading position by providing feed in the feed chute and then in the succeeding feed chutes to cause the cows to rapidly get into place for milking.

After the cows are in position, the operator washes the udder, strips a limited amount of milk by hand and applies the milking machines to the cows in one stall and repeats the process for the cows in the other stall thereby providing for efficient operation at all times.

Upon more detailed reference to the drawing, a milking parlor having an entrance end wall 10 and exit end wall 11, side walls 12, 12' and a ceiling or roof 13 is provided with a floor having a left section 14 and a right section 15 for receiving and supporting cows 16 in herringbone or echelon formation on opposite sides of an operator's pit 17 extending approximately the length of the milking parlor, suitable steps 18 and 19 being provided adjacent the entrance and exit ends for access to and from the pit to the floor level of the stalls.

A pair of zig-zag rails 20, 21 defining a fence are formed of individual L-shaped sections, a, b, c, d, e and f. A series of upwardly extending supporting rods 22, 23, 24 and 25 are fixed to both zig-zag rails 20 and 21 maintaining the rails in vertically spaced relation. The upper ends of such supporting rods are provided with flanges by means of which the rods are fixed to the ceiling 13 thereby suspending the zig-zag rails over the pit edge of the stall floor section 14. Vertically extending bars 26 are provided at each angle of the zig-zag rails 20 and 26 which are not secured to the suspending rods 22 to 25 inclusive thereby rigidifying the rail structure. Transverse diagonal supports 22A, 23A, 24A and 25A extend from a point on suspending rods 22, 23, 24 and 25 respectively above the rails 22 and 21 to a point on the ceiling on the opposite side of the pit 17 being secured by suitable flanges to the ceiling in a well-known manner, thereby preventing transverse swinging of the rails and their supporting rods. Longitudinally extending diagonal braces 22B, 24B extend from suspending rods 22 and 24 respectively upwardly in a direction toward the entrance wall and in a vertical plane defined by rods 22, 23, 24 and 25 thereby providing for longitudinal stability. Other diagonal rods 23B and 25B extend upwardly from rods 23 and 25 toward the exit wall 11 serving to further improve the longitudinal rigidity.

Corresponding supports and braces are provided for zig-zag rails 20', 21' which are positioned over the floor section 15 and are suspended by rods 22', 23', 24', and 25' respectively corresponding to the same numbers over the floor section 14. Similarly diagonal transverse braces 22A', 23A', 24A' and 25A' extend transversely upwardly from supporting rods 22', 23', 24' and 25' respectively over the pit 17 and are secured to the ceiling by flanges or the like while longitudinal braces 22B' and 24B' extend in the plane of suspending rods 22' to 25' to brace against longitudinal movement. Other longitudinal diagonal braces 23B' and 25B' additionally serve to brace against longitudinal movement. Similarly the rails 20' and 21' include a plurality of L-shaped sections a', b', c', d', e' and f' which are directly opposite the corresponding L-shaped sections a to f inclusive. Vertically extending rod elements 26' serve to additionally maintain the zig-zag rails 20' and 21' in vertically spaced relation. It will be apparent that the diagonal braces are preferably connected together at the points of crossing and may be connected to the various other supports at the points of crossing.

Arranged a cow length from the apexes of L-shaped sections *a, b, c, d, e,* and *f* are feed chutes A, B, C, D, E and F which chutes form the head end of a cow receiving position while, the shorter or trailing leg of the corresponding L-shaped section forming the rear limit of the cows position, and the other and longer leading leg of each L-shaped section forming the leading side limit for the leading cow to confine the adjacent hip of the cow, the belly of the next following cow serving to confine the other or trailing hip of the immediately adjacent leading cow. The longer or leading leg of the leading L-shaped section *a* has an exit gate 27 hinged thereto by a pivot 28, 28 and serves to confine the leading cow in its position. The gate 27 is controlled by suitable control cords which extend to a control position adjacent the steps 18 where the operator can control such gate.

An entrance gate 29 is hingedly mounted on pivots 30, 30 supported adjacent to feed chute F to provide for confining the trailing side of the last cow in the stall and such gate is preferably controlled from the control station.

An extra leg section 31 is provided at the entrance end of the zig-zag rails 20, 21 to provide for guiding the cows effectively into the stalls when the cows pass from the outside through the entrance door 32. It will be apparent that an exit door 33 is provided for the passage of the cows outwardly from the stall when the exit gate 27 is open, the exit and entrance door closures 32A, 33A being preferably controlled from the operator's station. The said feed chutes A to E inclusive are also controlled by suitable means adjacent the entrance steps 18 to the pit so that the cows can be induced to move on rapidly into position and fill the stalls. The feed chute A is first supplied with feed in a measured quantity which quantity can be determined by the operator's observation of the tag on each cow as the cow passes through the doorway 32 and into the stall. When the leading cow is in position, the following cows are induced to get into the next adjacent positions by the feed which is discharged into the feed troughs in the proper quantities for the particular cows based on the observation of the operator at the control point.

Similarly in the stall over section 15 the zig-zag rails 20', 21' provide L-shaped sections *a'* to *f'* inclusive. Feed chutes A' to F' inclusive serve to confine the cows in a similar manner so that the cows on the two sides of the milking parlor are arranged in herringbone formation and the udders of such cows are readily accessible from the longer or leading legs of the L-shaped sections without obstruction from anything below the lower zig-zag rail 20'. The corresponding parts of the milking parlor, gates, doors, etc. for the stall over floor section 15 are identified by corresponding numerals with the addition of a "'" mark and a repetition of the description will therefore be unnecessary.

Each feed chute is supported by suitable brackets 34, 35 which extend from the wall to the upstanding portion of the associated feed chute. Each feed chute has its upper end open as shown at 36 to a feed supply bin above the ceiling 13 to provide for continuous supply of feed to the chutes with the feed being controlled at the operator's station as previously explained.

In some locations where state laws require clearance between the feed chutes and the adjacent walls the brackets 34, 35 may be increased in dimensions or the chutes may be supported by other suitable means such as diagonal bracing and the like and such supports or bracing will be free of the floor to provide for easy cleaning.

It will also be evident that guard plates may be provided in portions of or for the entire length of the zig-zag rails to prevent splashing of the droppings of the cows on the operator, such plates being omitted for simplicity in showing. From the above description it will be apparent that the present invention provides for complete support of the stall and feed structure from the roof and/or roof of the milking parlor thereby leaving the floor perfectly clean of obstructions to provide for manipulation of the milking machines and for cleaning.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. An elongated milking room including a floor and a ceiling having a centrally located operator's pit extending an appreciable length of the room with the floor of the pit being substantially below the floor portions of the remainder of the room, a stall formed on each side of the pit between the edge of the pit and the adjacent side wall of the room to accommodate a plurality of cows for milking, a pair of zig-zag rails arranged above the floor of the stall and adjacent each edge of the pit, each zigzag rail having a plurality of L-shaped sections, said rails being formed of substantially continuous rods with the angularity of each leg of each L-shaped section being substantially at right angle to the adjacent leg of each L-shaped section and at an acute angle to the edge of the pit, the short legs of the L-shaped sections being approximately the center to center spacing of cows when the cows are arranged in echelon relation, means to suspend said zig-zag rails from the ceiling of the room without support from the floor thereby providing a clear space between the bottom rail and the floor with the bottom rail being located sufficiently above the stall floor to provide for access to the udder of a cow, means to close the ends of the stalls, feed trough arranged in staggered relation with respect to the corresponding short legs of the zig-zag rail at a distance corresponding to the head to rump length of a cow whereby when the stall is filled with the plurality of cows corresponding to the L-shaped sections of the rails, the cows will be in close side by side relation with their rumps closely adjacent the operator's pit whereby the operator may easily milk the cows without having to avoid supports extending from the bottom rail to the floor whereby the milking room may be easily cleaned.

2. A milking parlor for a plurality of cows and including a floor, a ceiling and side walls, a pair of elongated rails of zig-zag shape arranged above the floor, means to suspend said rails from the ceiling of the parlor with said rails spaced from the side walls to provide stall structure without contact with the floor thereby providing a clear space between the bottom rail and the floor with the bottom rail being located at a sufficient height to provide for easy access to the udder of a cow, means to close the ends of the stall structure between the said rails and the adjacent side wall, feed troughs arranged in spaced relation with respect to the rails at distances corresponding to the head to rump of a cow whereby when the stall is filled with the plurality of cows, the cows will be in close side by side relation without interfering supports extending from the rails whereby the milking parlor may be easily cleaned.

3. A stall structure for confining animals comprising confining elongated rail means of zigzag shape for limiting movement of the animals and providing for ease of cleaning, said structure including supports secured to the overhead ceiling or roof and supporting the confining structure with sufficient rigidity to confine the animals and free of supporting structure extending to the floor whereby the floor may be effectively cleaned without interfering obstructions.

4. A barn for confining animals comprising a room having a floor, end walls and side walls, an elongated confining fence of zig-zag shape between the walls and spaced from the wall a sufficient distance to accommodate an animal between the confining fence and the wall, and means to support the confining fence solely from the ceiling and walls of the barn to provide an entirely clear floor for easy access to the animals from below the fence and to provide for easy cleaning.

5. A milking parlor comprising an elongated room having an operator's pit extending the length thereof, an elongated fence structure of zigzag shape adjacent the edge of the pit for confining animals between the edge of the pit and the wall, means to support said confining fence solely from the ceiling of the room, said supporting means including upwardly extending supports from the fence and diagonal braces engaging the upwardly extending supports to rigidify the fence in all directions.

6. The invention according to claim 5 in which gates are mounted in position to provide for entry to the space between the fence and the wall and for exit from such space.

7. An elongated milking room having a workman receiving pit extending longitudinally and centrally thereof and separating raised cow supporting floor sections, stall structures on each side of said pit comprising rump confining rail structure adjacent each edge of said pit, said rump confining rail structure including a plurality of L-shaped sections with the length of one leg substantially the average width of a cow and the length of the other leg substantially the portion of the length of a cow from the rump to the forward end of the udder, one leg of each L-shaped section being connected to the other leg of the adjacent L-shaped section and a plurality of sections providing the zigzag rump confining rail structure for a plurality of cows, an entrance gate pivotally mounted adjacent one end of said stall structure adjacent a side wall of the room movable from a closed position substantially parallel with the other leg of the entrance end L-shaped section and spaced toward the entrance end by the length of the one leg and movable to an open position to provide for entry of the cows into the stall structure, and an exit gate pivotally mounted adjacent the other end of said stall structure in operative relation to the other leg of the L-shaped section at the other end of the stall structure to provide for retention or for egress of the cows from the stall structure.

8. An elongated milking room having a workman receiving pit extending longitudinally and centrally thereof and separating raised cow supporting floor sections, stall structures on each side of said pit comprising rump confining rail structure adjacent each edge of said pit, said rump confining rail structure including a plurality of L-shaped sections with the length of one leg substantially the average width of a cow and the length of the other leg substantially the portion of the length of a cow from the rump to the forward end of the udder, one leg of each L-shaped section being connected to the other leg of the adjacent L-shaped section and a plurality of sections providing the zigzag rump confining rail structure for a plurality of cows, an entrance gate pivotally mounted adjacent one end of said stall structure adjacent a side wall of the room movable from a closed position substantially parallel with the other leg of the entrance end L-shaped section and spaced toward the entrance end by the length of the one leg and movable to an open position to provide for entry of the cows into the stall structure, and an exit gate pivotally mounted adjacent the other of said stall structure in operative relation to the other leg of the L-shaped section at the other end of the stall structure to provide for retention or for egress of the cows from the stall structure, feed supporting means mounted adjacent the side wall of the room substantially opposite the one leg of each L-shaped section and spaced therefrom substantially the length of a cow in a direction parallel to the other leg of the L-shaped section, and means to dispense feed to said feed supporting means whereby the cows will be directed into milking position and feeding position by opening the entrance gate at said one end and keeping the exit gate closed at said other end, the rump rail structure providing for easy unimpeded access to the udder of the cows and for confining the cows in milking position.

9. The invention according to claim 7 in which the support for the rump confining rails includes uprights and diagonal bracing extending upwardly over the workman-receiving pit and diagonal bracing extending longitudinally between the apices of selected L-shaped cow confining sections, said rump confining rails being free of the floor to provide for easy cleaning.

10. The invention according to claim 9 in which an additional other leg is provided at the entrance of each stall structure to guide cows into the entrance of the associated stall structure.

11. A stall structure to facilitate milking of cows comprising an elongated stall floor section of a width not greater than the length of a cow from the rump to the head thereof, an operator's pit at one edge of said stall floor section, said pit having an operator supporting floor substantially below the floor of the stall section and at a level to permit a standing operator to readily apply milking apparatus to and remove milking apparatus from cows on said stall floor section without requiring the operator to assume an uncomfortable position, a substantially straight wall defining the operator's pit and the stall floor and providing an undercut to permit the operator to stand close to the wall to avoid objectionable reaching, a rump confining rail structure adjacent said one edge of the stall floor section and immediately thereabove, said rump confining rail structure including a plurality of L-shaped sections with the length of one leg substantially the average width of the group of cows to be milked and the length of the other leg being substantially the average length of the cows to be milked from the rump to the forward end of the udder, one leg of each L-shaped section being connected to the other leg of the adjacent L-shaped section with the angles between each L-shaped section and the legs of each L-shaped section being substantially 90° and a plurality of L-shaped rail sections providing a zig-zag rump confining rail structure for the plurality of cows, a plurality of feed chutes corresponding to the number of cows adjacent the other edge of the stall floor section with each feed chute substantially opposite the corresponding said one leg of the associated L-shaped section and spaced from the associated L-shaped section substantially the length of a cow from the rump to the head as measured in a substantially normal direction to the said one leg of the associated L-shaped section whereby said feed chute, the associated one leg section and the associated other leg section of the co-operating L-shaped section define a rump end wall, a head wall and a partial side wall respectively for positioning one cow in its milking position, the cow in each adjacent position between its L-shaped rail section and the associated feed chute serving to confine the said one cow, the cow on one side confining the head of the said one cow and the cow on the other side confining the belly and the rump of the said one cow, the end cows being confined by gates, a gate at the entrance end extending between the entrance end L-shaped rail section and feed chute and pivoted adjacent the feed chute for the cow position at the entrance end and a gate for the cow at the exit end extending between the exit end L-shaped rail section and the associated feed chute and pivoted adjacent the rail structure, the structure being such that the cows will be guided and will autmoatically take their positions when the gate at the entrance end is open and the gate at the exit end is closed and the feed chutes are filled with feed to attract the cows to their proper positions, the cows being readily discharged when the exit gate is opened.

12. Stall structure for use in a milking parlor room having a centrally disposed workman-supporting pit, rump retaining zigzag fence structure for mounting in suspended relation from the ceiling of the room adjacent at least one edge of the pit with the fence structure being clear of the floor and spaced from the cow-supporting portion of the floor for permitting adequate and unimpeded access to the udders of the cows while the floor is kept free of portions of the fence structure avoiding the collection of dirt on obstructions along the floor whereby the operator can easily manipulate the cows during the milking operation with no danger of injury to the operator or the cows, and means for supporting the rump fence structure entirely from the ceiling with sufficient overhead clearance for the cows and the operator with a minimum of ceiling height in the room.

13. A milking parlor room comprising a workman-supporting pit below the floor of the room a sufficient distance so that the udder of a cow will be at an easily accessible height when the cow is on the floor adjacent the pit, a pair of zigzag rods arranged in vertically spaced relation adjacent an edge of the pit forming a fence, a plurality of vertically extending posts suspended from the ceiling of the room to and supporting said zigzag rods in fixed relation to the edge of the operator's pit, said vertically extending suspended posts being entirely free of the floor, and diagonal bracing extending from said vertically extending posts over the operator's pit with minimal portions thereof over the cow-supporting floor, means to secure said diagonal braces to the ceiling, and gate means at each end of said rod fence for maintaining the cows in echelon arrangement with their rump portions substantially abutting the zigzag portion of the rod fence whereby an operator can reach the udder of the cow without any obstruction and neither the cow nor the operator can be injured.

References Cited in the file of this patent

UNITED STATES PATENTS

| | | |
|---|---|---|
| 1,043,293 | Boyce | Nov. 5, 1912 |
| 2,081,947 | McCornack | June 1, 1937 |
| 2,740,377 | Duncan | Apr. 3, 1956 |
| 2,969,039 | Golay | Jan. 24, 1961 |

FOREIGN PATENTS

| | | |
|---|---|---|
| 6,288 | Great Britain | Mar. 13, 1913 |